(12) United States Patent
Sato

(10) Patent No.: US 8,276,420 B2
(45) Date of Patent: Oct. 2, 2012

(54) ROLL UNIT FOR USE IN SURFACE TREATMENT OF COPPER FOIL

(75) Inventor: Haruo Sato, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 496 days.

(21) Appl. No.: 12/521,151

(22) PCT Filed: Dec. 11, 2007

(86) PCT No.: PCT/JP2007/073818
§ 371 (c)(1),
(2), (4) Date: Jun. 25, 2009

(87) PCT Pub. No.: WO2008/081688
PCT Pub. Date: Jul. 10, 2008

(65) Prior Publication Data
US 2010/0018273 A1    Jan. 28, 2010

(30) Foreign Application Priority Data
Dec. 28, 2006   (JP) .................................. 2006-353892

(51) Int. Cl.
*B21B 28/00* (2006.01)
*B21B 27/06* (2006.01)
*B21B 31/00* (2006.01)
(52) U.S. Cl. .......................................... 72/236; 72/245
(58) Field of Classification Search ............... 184/105.3, 184/6.8, 6.17, 5, 5.1; 384/462, 473–475, 384/489, 538, 540, 584, 585; 74/569; 72/237, 72/238, 245, 247, 249, 252.5, 236
See application file for complete search history.

(56) References Cited

U.S. PATENT DOCUMENTS

| | | | |
|---|---|---|---|
| 3,910,833 A | 10/1975 | Knighton | |
| 5,582,482 A * | 12/1996 | Thom et al. | 384/538 |
| 5,697,710 A * | 12/1997 | Iida et al. | 384/473 |
| 5,876,127 A * | 3/1999 | Casey | 384/538 |
| 6,287,014 B1 | 9/2001 | Salla | |

(Continued)

FOREIGN PATENT DOCUMENTS

JP        05-237523 A    9/1993

(Continued)

*Primary Examiner* — Dana Ross
*Assistant Examiner* — Pradeep C Battula
(74) *Attorney, Agent, or Firm* — Howson & Howson LLP

(57) ABSTRACT

Provided is a roll unit for use in a surface treatment of a copper foil, wherein shaft sleeves are fitted to a roll shaft of a roll so that the roll shaft is rotatably supported by a bearing via the shaft sleeves. Additionally provided is a roll unit wherein the shaft sleeves consist of two sleeves, namely a roll-side sleeve arranged on a roll main body side and a tapered sleeve arranged on a shaft end side, an oil seal is arranged between the roll-side sleeve and a bearing box, and the tapered sleeve is supported by a bearing disposed in the bearing box. Thus, this invention relates to a roll unit to be used in electrochemical surface treatments, such as roughening treatment, rust prevention treatment and surface oxidation treatment, to be continuously performed on a surface of a rolled copper foil or an electrolytic copper foil, and in particular relates to a roll unit capable of inhibiting the abrasion and corrosion of the roll shaft of such roll unit and capable of simple replacement of the bearing box, bearing and other components.

17 Claims, 3 Drawing Sheets

U.S. PATENT DOCUMENTS

| | | |
|---|---|---|
| 6,517,690 B2 | 2/2003 | Ko |
| 7,976,687 B2 | 7/2011 | Sato |
| 2006/0093251 A1* | 5/2006 | Casey et al. .................. 384/538 |
| 2007/0012081 A1* | 1/2007 | Shriner et al. ................... 72/237 |

FOREIGN PATENT DOCUMENTS

| | | |
|---|---|---|
| JP | 08-159163 A | 6/1996 |
| JP | 09-177797 A | 7/1997 |
| JP | 10-238541 A | 9/1998 |
| JP | 11-108066 A | 4/1999 |
| JP | 2000-130569 A | 5/2000 |
| JP | 2002-235761 A | 8/2002 |
| JP | 2005-068512 A | 3/2005 |
| JP | 2005-126779 A | 5/2005 |
| JP | 2006-046449 A | 2/2006 |

* cited by examiner

[Figure 1]
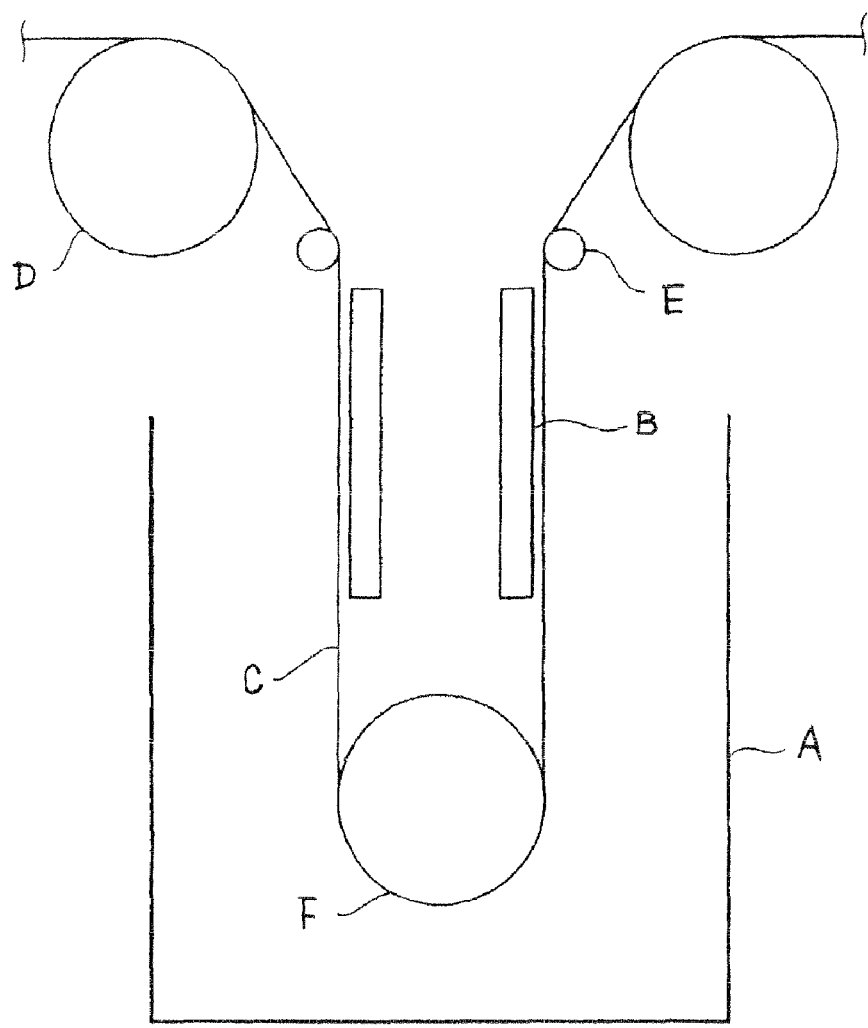

[Figure 2]
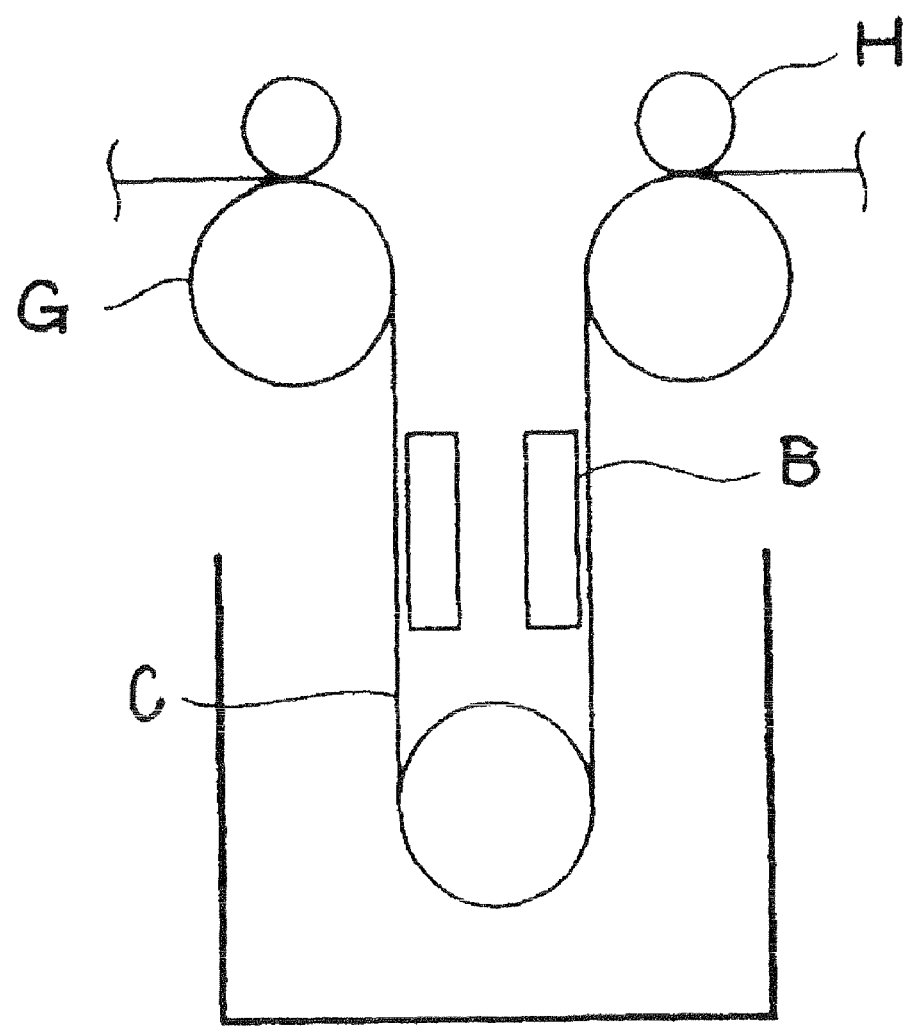

[Figure 3]
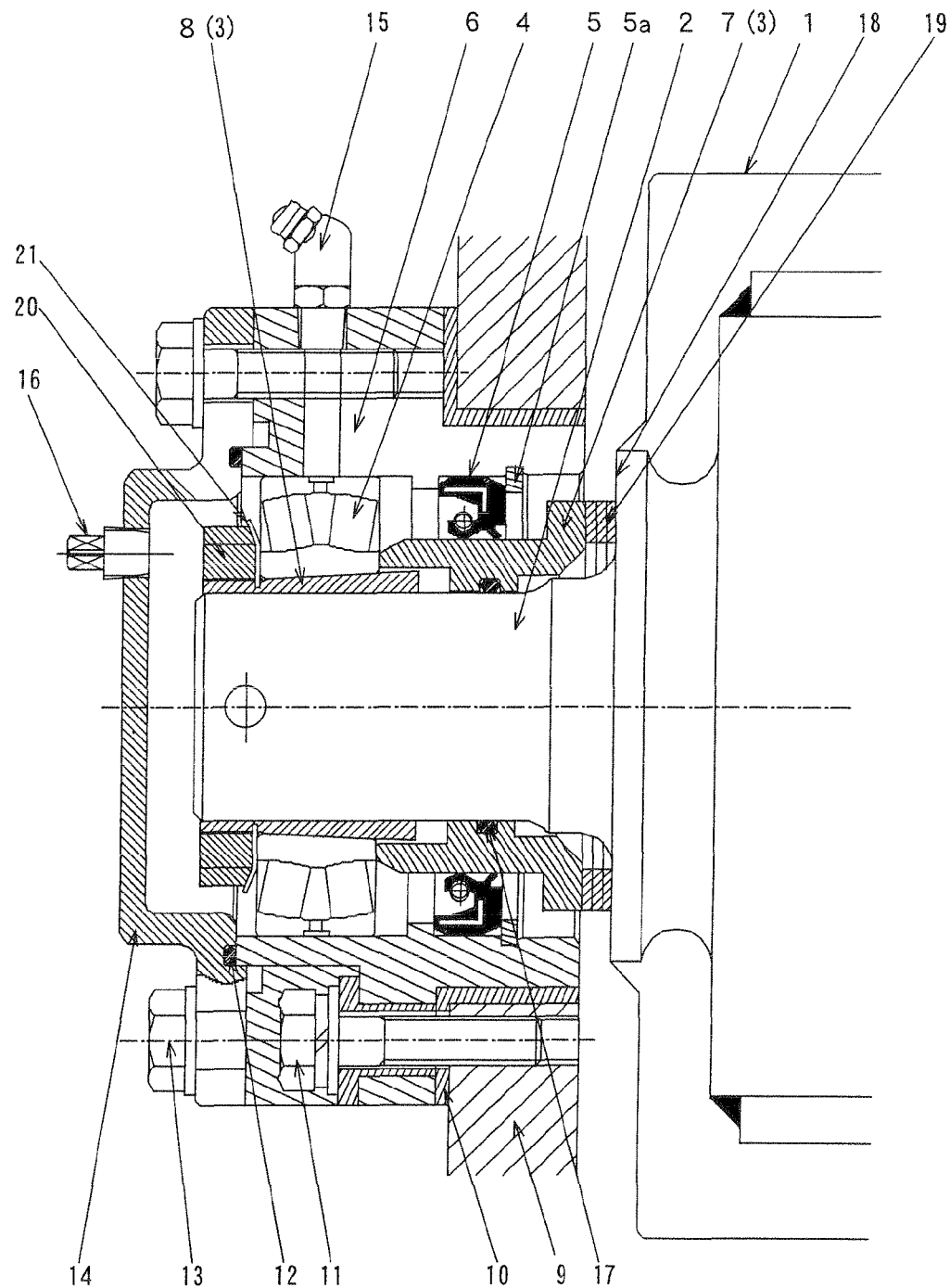

ROLL UNIT FOR USE IN SURFACE TREATMENT OF COPPER FOIL

BACKGROUND OF THE INVENTION

The present invention relates to a roll unit to be used in an apparatus that continuously performs electrochemical surface treatments, such as roughening treatment, rust prevention treatment and surface oxidation treatment (blackening treatment), on a surface of a rolled copper foil or an electrolytic copper foil; and in particular relates to a roll unit that can be used under a corrosion environment that generates corrosive mist.

In recent years, copper foil is being widely used in the manufacture of electronic components, wiring substrates and the like.

Generally speaking, an electrolytic copper foil is continuously manufactured by: using a rotating metal cathode drum and an insoluble metal anode (positive electrode) placed to surround roughly the lower half part of the cathode drum; electrodepositing copper on the cathode drum by flowing copper electrolyte between the cathode drum and the anode and applying a potential therebetween; and, when achieving a prescribed thickness, peeling the electrodeposited copper from the cathode drum.

In addition, the rolled copper foil is manufactured by repeatedly subjecting a melted and cast ingot to rolling and annealing multiple times.

As described above, the electrolytic copper foil and the rolled copper foil are continuously manufactured by being winded around a coil, and the obtained copper foils are used in a printed wiring board and the like after subsequently being subject to several chemical or electrochemical surface treatments.

Generally speaking, the electrochemical surface treatment of a copper foils is continuously performed by using an apparatus as shown in FIG. 1. FIG. 1 shows a lateral schematic diagram of a continuous surface treatment apparatus of a copper foil.

As shown in FIG. 1, a copper foil C winded around a coil (not shown) is continuously passed in front of opposed anodes B via several upper rolls D and a lower roll F arranged inside and outside an electrolytic tank A by being rewound, and subject to surface treatment. The surface-treated copper foil C is winded around the coil (not shown) once again. E is a guide roll. FIG. 2 shows an example of a squeeze roll unit that is attached to the continuous surface treatment apparatus. This unit comprises large-diameter rolls G corresponding to the upper rolls D of FIG. 1 and small-diameter squeeze rolls H arranged opposite thereto.

Incidentally, the squeeze roll may also be structured from stainless steel, or by using SUS304 for the shaft, steel for the cored bar of the body, and rubber lining for the outer periphery of the body.

The electrolytic tank is provided with an electrolytic solution for use in treatment such as a plating solution for roughening treatment and rust prevention treatment. The structure enables the circulation of the electrolytic solution that was replenished to or used for the initial make-up of electrolytic bath in the electrolytic tank. Current for surface treatment is flowed between the anode and the copper foil as the cathode via the electrolytic solution.

As the anode, although an insoluble anode such as a Pb plate or a noble metal oxide coated Ti plate is usually used, a soluble anode which itself melts and is electrodeposited on the copper foil may also be used. This may be changed as needed according to the conditions of the electrochemical treatment.

The width of the anode is usually decided according to the required surface treatment width of the copper foil. In the conventional electrochemical surface treatment of a copper foil described above, generally speaking, in order to prevent the solution in a former bath from getting into a subsequent bath between mutual surface treatment baths, or between a surface treatment bath and a rinsing bath, or between the foregoing baths and a winding unit, the surface-treated copper foil is passed through the squeeze roll to eliminate the solution that adhered to the surface-treated copper foil.

Solutions such as copper sulfate and chromic acid are used in the electrochemical surface treatment, and this causes a corrosion environment that is filled with gas and mist generated from the foregoing treatment solutions. With the rolls used under the foregoing circumstances, gas and mist infiltrate into the bearing, and there is a problem in that the bearing in particular is subject to severe abrasion. Thus, devices have been designed to inhibit the abrasion by filling grease into the bearing of the roll and to facilitate the replacement of the roll bearing, but such devices were insufficient.

Generally speaking, one reason that the shaft is subject to abrasion is due to the shaft abrasion that is caused by the sliding between the roll shaft and the bearing inner ring. In the foregoing case, gas and mist infiltrate the bearing of the bearing box, and it causes the bearing to corrode and results in defective rotation. Moreover, since the bearing is subject to defective rotation, sliding occurs between the roll shaft and the bearing inner ring, and the abrasion of the roll shaft, which is softer, is accelerated.

Further, although SUS304 is used as the roll shaft material for preventing the corrosion caused by gas and mist, since the reforming (hardening) of the surface of the SUS material by way of quenching is difficult, the hardness consequently becomes lower than the bearing inner ring, and it did not provide a fundamental solution.

Moreover, in the case of a structure where the oil seal and the roll shaft are in direct contact, if they are used for a long period of time, the phenomenon of the roll shaft surface being subject to abrasion on the contact surface will occur.

Moreover, since an electric field is impressed to the copper foil that comes in contact with the roll and moves during the electrochemical surface treatment, when this flows up to the roll housing (mounting frame) via a squeeze roll, there is a problem in that the copper powder will be electrodeposited on the roll, and, if the copper powder adheres to the roll, there is a problem that such copper powder will be transferred to the copper foil, whereby the quality of the copper foil will deteriorate.

When taking a squeeze roll as an example, if a standard rubber material is used in the squeeze roll, the copper powder will not be electrodeposited on the squeeze roll surface since the electrical insulation of rubber is high, but large amounts of carbon are often included in the rubber in order to improve the abrasion resistance. The reason for improving the abrasion resistance is that the squeeze roll is pressed against the upper roll at a pressure of roughly 1.2 tons, and the rubber on the roll surface is easily subject to abrasion and thereby causes adherence of rubber fragments to the copper foil surface. Large amounts of carbon are added in order to prevent the above and improve the abrasion resistance. Nevertheless, the use of a roll containing large amounts of carbon will cause a problem of considerably deteriorating the electrical insulation.

In addition, although there is a proposal of filling grease in the bearing as described above and providing an oil seal in order to inhibit the corrosion within the bearing, there was a problem in that the grease would flow to the roll main body and contaminate the roll.

In the conventional technology, a double-seal structured leakproof roll referred to as a plummer block is proposed for preventing the leakage of grease to the rolls for transporting products (refer to Patent Document 1). Nevertheless, with this kind of structure alone, it is not possible to prevent the infiltration of mist in a corrosion environment into the bearing, and it is therefore not possible to overcome the problem that the roll shaft is subject to severe abrasion.

[Patent Document 1] Japanese Patent Laid-Open Publication No. H8-159163

SUMMARY OF THE INVENTION

The present invention was devised in view of the foregoing problems, and relates to a roll unit to be used in an apparatus that continuously performs electrochemical surface treatments, such as roughening treatment, rust prevention treatment and surface oxidation treatment (blackening treatment), on a surface of a rolled copper foil or an electrolytic copper foil; and in particular relates to a roll unit that can be used under a corrosion environment caused by the adhesion of treatment liquid and the corrosive mist generated from the surface treatment liquid. An object of the present invention is to provide a roll unit capable of inhibiting the abrasion and corrosion of the roll shaft and the bearing and capable of simple replacement of the bearing box, bearing and other components.

In light of the above, the present invention provides:
1. A roll unit for use in a surface treatment of a copper foil, wherein shaft sleeves are fitted to a roll shaft of a roll so that the roll shaft is rotatably supported by a bearing via the shaft sleeves;
2. The roll unit for use in a surface treatment of a copper foil according to paragraph 1 above, wherein the roll unit comprises a structure where the shaft sleeves consist of two sleeves, namely a roll-side sleeve arranged on a roll main body side and a tapered sleeve arranged on a shaft end side, an oil seal is provided between the roll-side sleeve and a bearing box, the tapered sleeve is inserted between the bearing and the roll shaft, and the roll shaft is rotatably supported by the bearing via the tapered sleeve;
3. The roll unit for use in a surface treatment of a copper foil according to paragraph 1 or paragraph 2 above, wherein the bearing box is detachably fixed to a roll mounting frame via an insulating bushing;
4. The roll unit for use in a surface treatment of a copper foil according to any one of paragraphs 1 to 3 above, wherein a bearing box cover is arranged on an edge of the bearing box via an O-ring; and
5. The roll unit for use in a surface treatment of a copper foil according to any one of paragraphs 1 to 4 above, wherein a grease nipple having a structure where grease is introduced is provided to the bearing box immediately above the bearing, and a plug for discharging old grease is disposed on the bearing box cover.

The present invention additionally provides:
6. The roll unit for use in a surface treatment of a copper foil according to any one of paragraphs 1 to 5 above, wherein an O-ring is provided to an inner peripheral surface of the roll-side sleeve, and an adjustment liner is provided between a lateral face of the roll-side sleeve and a lateral face of the roll main body so as to adjust the position of the roll-side sleeve;
7. The roll unit for use in a surface treatment of a copper foil according to any one of paragraphs 1 to 6 above, wherein the tapered sleeve to be inserted between the roll shaft and the bearing is of a tapered face in which the diameter of an outer peripheral surface decreases in an edge direction of the roll shaft, and an inner peripheral surface of the bearing opposed to the tapered sleeve has a tapered face in which the inner diameter decreases in an edge direction of the roll shaft;
8. The roll unit for use in a surface treatment of a copper foil according to any one of paragraphs 1 to 7 above, wherein thread is formed to an end face of the tapered sleeve, and the bearing is subject to relative displacement on the sleeve by engaging a locknut to the thread and screwing tightly so as to eliminate a gap between the bearing and the tapered sleeve; and
9. The roll unit for use in a surface treatment of a copper foil according to any one of paragraphs 1 to 8 above, wherein a washer is inserted between the bearing and the tapered sleeve so as to prevent the loosening of the locknut and facilitate the removal of the bearing.

The present invention further provides:
10. The roll unit for use in a surface treatment of a copper foil according to any one of paragraphs 1 to 9 above, wherein an inner peripheral surface on the tapered sleeve side of the roll-side sleeve is slightly larger than an outer peripheral surface of the tapered sleeve and partially covers the outer peripheral surface of the tapered sleeve, and a gap is provided between the roll-side sleeve and the tapered sleeve so as to enable mutual movement;
11. The roll unit for use in a surface treatment of a copper foil according to any one of paragraphs 1 to 10 above, wherein the roll unit comprises a structure of constraining the relative displacement of the bearing edge by an end face of the roll-side sleeve; and
12. The roll unit for use in a surface treatment of a copper foil according to any one of paragraphs 1 to 11 above, wherein, by releasing the constraint of the bearing box cover, the bearing box, the bearing, the roll-side sleeve, the tapered sleeve, the oil seal, the insulating bushing, the adjustment liner, and the washer, all of the foregoing components can be removed from the roll shaft and the mounting frame.

The present invention provides, as described above, a roll unit in which shaft sleeves are fitted to a roll shaft of a roll so that the roll shaft is rotatably supported by a bearing via the shaft sleeves, whereby the bearing box, the bearing, and other components can be easily replaced. Consequently, the present invention provides a roll unit that can be used under a corrosion environment since it is able to inhibit the abrasion and corrosion of the roll shaft and the bearing of such roll unit caused by the adhesion of treatment liquid and the corrosive mist generated from the surface treatment liquid, and thereby yields a superior effect of being able to improve the productivity of the surface treatment apparatus.

BRIEF DESCRIPTION OF THE DRAWINGS

FIG. 1 is a lateral schematic diagram of a continuous surface treatment apparatus for a copper foil;

FIG. 2 is a sectional explanatory diagram of a squeeze roll comprising a small-diameter stainless steel roll disposed on and facing a large-diameter roll; and FIG. 3 is a sectional explanatory diagram of a bearing of a roll unit for use in a surface treatment of a copper foil.

DETAILED DESCRIPTION OF THE INVENTION

A representative example of the present invention is now explained with reference to the attached drawings. Incidentally, the following explanation illustrates a preferred embodiment, and is not intended to limit the present invention in any way. Thus, modifications and other examples and modes included in the technical concept of the present invention provided in the claims and specification are all covered by this invention.

Although the roll unit for use in a surface treatment of a copper foil according to the present invention will be explained by mainly taking a squeeze roll as the example, it goes without saying that the roll unit explained below can also be used in other roll unites such as a guide roll unit for use in a surface treatment apparatus. The present invention may similarly be applied to any roll unit that needs to inhibit the abrasion and corrosion of the roll shaft and the bearing of such roll unit caused by the adhesion of treatment liquid and the corrosive mist generated from the surface treatment liquid.

The roll unit for use in a surface treatment of a copper foil according to the present invention comprises a structure in which shaft sleeves 3 are fitted on a roll shaft 2 of a roll 1, and the roll shaft 2 is rotatably supported by a bearing 4 via the shaft sleeves 3. The shaft sleeve 3 is primarily manufactured from stainless (SUS304), but non-stainless materials may also be used so as long as they are superior in abrasion resistance, corrosion resistance, and strength.

As a result of providing the shaft sleeves 3, the roll shaft 2 and a oil seal 5 described later will not come in direct contact, and this yields a significant feature of being able to prevent the abrasion of the roll shaft 2. The shaft sleeve 3 can be fixed to the roll shaft 2 with a locknut 20 described later, and the shaft sleeve 3 can also be adjustably fixed to the bearing disposed in a bearing box 6. Consequently, it is possible to prevent the displacement of the roll 1 with respect to the bearing box 6 in the shaft direction.

If the roll is displaced excessively in the shaft direction, a lateral face (support) 18 of the roll main body will come in contact with a mounting frame 9 and the roll will be subject to defective rotation. A roll shaft-side sleeve 7 and an adjustment liner (sleeve) 19 are arranged to overcome the foregoing problem. It is thereby possible to prevent the displacement of the roll in the shaft direction.

The shaft sleeves 3 may consist of two sleeves; namely, a roll-side sleeve 7 arranged on the roll main body side of the roll 1 and a tapered sleeve 8 arranged on the shaft end side. An oil seal 5 is arranged between the roll-side sleeve 7 and a bearing box 6. The oil seal 5 can be placed in a hollow provided in the bearing box 6 and fixed with a snap ring 5a. Meanwhile, the tapered sleeve 8 is directly supported by the bearing 4 disposed in the bearing box 6.

The bearing box 6 is detachably fixed to a roll mounting frame 9 via an insulating bushing 10. This fixation can be implemented using a fixing screw or a fixing bolt 11.

As evident from the foregoing explanation, the bearing box 6 has the function of housing and retaining the bearing 4 and the oil seal 5. The insulating bushing 10 is able to prevent the current of the copper foil (not shown in FIG. 2) as the work piece from flowing to the roll mounting frame 9, and it is thereby possible to inhibit the copper powder from being electrodeposited onto the surface of the roll 1. For the bearing 4, a self-aligning roller bearing formed from bearing steel is used, but there is no particular limitation on the structure and material of the bearing.

A bearing box cover 14 is detachably mounted at the edge of the bearing box 6 with a fixing bolt 13 via an O-ring 12. The bearing box cover 14 is usually manufactured from stainless (SUS304) as with the other materials. Nevertheless, non-stainless materials may also be used so as long as they are superior in abrasion resistance, corrosion resistance, and strength. The bearing box cover 14 prevents the plating solution mist from infiltrating into the bearing box 6.

Moreover, by arranging the bearing box cover 14 at the lateral face of the bearing box 6, the bearing box cover 14 can be opened to facilitate access to the bearing box, the bearing, the roll-side sleeve, the tapered sleeve, the oil seal, the insulating bushing, the adjustment liner, the washer and other components. This allows for shorter replacement of components such as the bearing.

A grease nipple 15 for injecting grease is provided to the bearing box 6 immediately above the bearing 4. A plug 16 for discharging old grease is provided to the bearing box cover 14. The grease (oil) introduced from the grease nipple 15 will fill the bearing box 6, but the oil seal 5 disposed between the bearing-side sleeve 7 and the bearing box 6 will prevent the oil from leaking to the roll main body side, and, therefore, the roll will not be contaminated by the oil. Incidentally, the oil seal 5 concurrently plays the role of preventing the infiltration of external plating solution mist into the bearing box 6.

Moreover, although the roll itself is in contact with the surface-treated copper foil, since the corrosive surface treatment liquid adhered to the copper foil is also transferred to the roll, it may further flow to the bearing. However, the foregoing structure is able to prevent the penetration of the surface treatment liquid to the bearing box, and functions to prevent the bearing and other components from rusting.

An O-ring 17 is provided to the inner peripheral surface of the roll-side sleeve 7, and an adjustment liner 19 is provided between the lateral face of the roll-side sleeve 7 and the lateral face 18 of the roll main body. The O-ring 17 inhibits the infiltration of the plating solution mist from the matching surface of the inner peripheral surface of the roll-side sleeve 7 and the roll shaft 2. NBR (nitrile rubber) is preferably used as this material, but other materials may also be used so as long as they have superior sealability. Desirably, the diameter of the lateral face 18 of the roll main body is slightly expanded, and it is structured to have an area capable of sandwiching the adjustment liner 19.

As a result of arbitrarily setting the adjustment liner 19, the position of the roll-side sleeve 7 on the roll shaft 2 can be adjusted and fixed. Although stainless (SUS304) is generally used as the material of the adjustment liner 19, non-stainless materials may also be used so as long as they are superior in abrasion resistance, corrosion resistance, and strength.

The tapered sleeve 8 to be inserted between the roll shaft 2 and the bearing 4 is of a tapered face in which the diameter of the outer peripheral surface decreases in the edge direction of the roll shaft 2, and the inner peripheral surface of the bearing opposed to the tapered sleeve has a tapered face in which the inner diameter decreases in an edge direction of the roll shaft 2.

In addition, thread is formed to an exterior end face of the tapered sleeve 8, and the bearing 4 is subject to relative displacement on the tapered sleeve 8 by engaging a locknut 20 to the thread and screwing tightly so as to eliminate a gap between the bearing 4 and the tapered sleeve 8.

A washer (tooth lock washer) 21 is inserted between the bearing 4 and the tapered sleeve 8 so as to prevent the loosening of the locknut 20 and facilitate the removal of the bearing 4. In other words, the disassembly of components such as the bearing 4 is facilitated.

The three components, namely the locknut 20, the tapered sleeve 8 and the washer (tooth lock washer) 21, can be collectively referred to as an adapter. The adapter can be manufactured from stainless (SUS304) or other materials that are superior in abrasion resistance, corrosion resistance, and strength.

When disassembling the components, the locknut 20 is loosened midway, and the edge of the locknut 20 is hammered in the roll main body direction so as to slide the tapered sleeve 8 in the roll shaft 2 direction and create a slight gap between the bearing 4 and the tapered sleeve 8. As a result of eliminating the force of constraint of the mutual tapered faces, the bearing 4 can be removed easily. The reason for this is because, as described later, the tapered sleeve 8 can be moved in the shaft direction since there is a gap between the roll-side sleeve 7 and the tapered sleeve 8 and these components are not in direct contact, whereby mutual movement is enabled.

The inner peripheral surface on the tapered sleeve 8 side of the roll-side sleeve 7 is slightly larger than an outer peripheral surface of the tapered sleeve 8 and partially covers the outer peripheral surface of the tapered sleeve 8, and a gap is provided between the roll-side sleeve 7 and the tapered sleeve 8.

Consequently, the roll-side sleeve 7 and the tapered sleeve 8 will not be in direct contact, thereby enabling mutual movement. Moreover, the roll unit comprises a structure of constraining the relative displacement of the bearing 4 edge by an end face of the roll-side sleeve 7. Consequently, displacement of the roll 1 in the shaft direction can be prevented.

According to the foregoing structure, by releasing the constraint of the bearing box cover, the bearing box, the bearing, the roll-side sleeve, the tapered sleeve, the oil seal, the insulating bushing, the adjustment liner, and the washer, all of the foregoing components can be removed from the roll shaft and the mounting frame.

The copper foil (work piece) to be used in the present invention may be either an electrolytic copper foil or a rolled copper foil. It also goes without saying that there is no limitation in the thickness of the copper foil. As the type of surface treatment to be performed, all types of electrochemical treatments including the roughening treatment for forming a particle bed by way of plating or the like, coat plating, rust prevention treatment including chromium and/or zinc after the plate processing, blackening treatment and the like may be performed. The present invention can be applied to all roll unites that need to inhibit the abrasion and corrosion of the roll shaft and the bearing of such roll unit caused by the adhesion of treatment liquid and the corrosive mist generated from the surface treatment liquid.

The present invention enables to protect the bearing of a roll unit from the external corrosion atmosphere (mist from the plating solution of copper sulfate, chromic acid, etc.) or the corrosive treatment liquid adhered to the copper foil upon manufacturing a surface-treated copper foil, and to thereby prolong the life of the bearing, and allows for shorter replacement of the roll or the bearing by using a bearing of a tapered sleeve. In addition, as a result of using shaft sleeves, it is possible to prevent the roll shaft and the rubber seal from coming into direct contact, prevent the abrasion of the roll shaft, and prevent the displacement of the roll in the shaft direction.

Moreover, as a result of using an insulating bushing, electrical insulation is provided between the roll and the mounting frame to yield the effect of inhibiting the copper powder from being electrodeposited on the surface of the roll 1. Accordingly, the present invention is able to improve the productivity, and is useful as a roll unit for performing continuous electrochemical surface treatments such as roughening treatment, rust prevention treatment, surface oxidation treatment (blackening treatment) to be performed to the surface of the rolled copper foil or the electrolytic copper foil.

The invention claimed is:

1. A roll unit for use in a surface treatment of a copper foil, wherein shaft sleeves are fitted to a roll shaft so that the roll shaft is rotatably supported by a bearing via the shaft sleeves, wherein the roll unit comprises a structure where the shaft sleeves consist of two sleeves, namely a roll-side sleeve arranged on a roll main body side and a tapered sleeve arranged on a shaft end side, an oil seal is provided between the roll-side sleeve and a bearing box, the tapered sleeve is inserted between the bearing and the roll shaft, and the roll shaft is rotatably supported by the bearing via the tapered sleeve, wherein the tapered sleeve to be inserted between the roll shaft and the bearing is of a tapered face in which the diameter of an outer peripheral surface decreases in an edge direction of the roll shaft, and an inner peripheral surface of the bearing opposed to the tapered sleeve has a tapered face in which the inner diameter decreases in an edge direction of the roll shaft, and wherein an O-ring is provided to an inner peripheral surface of the roll-side sleeve, and an adjustment liner is provided between a lateral face of the roll-side sleeve and a lateral face of a main body of the roll unit so as to adjust a position of the roll-side sleeve.

2. The roll unit for use in a surface treatment of a copper foil according to claim 1, wherein the bearing box is detachably fixed to a roll mounting frame via an insulating bushing.

3. The roll unit for use in a surface treatment of a copper foil according to claim 2, wherein a bearing box cover is arranged on an edge of the bearing box via an O-ring.

4. The roll unit for use in a surface treatment of a copper foil according to claim 3, wherein a grease nipple having a structure where grease is introduced is provided to the bearing box immediately above the bearing, and a plug for discharging old grease is disposed on the bearing box cover.

5. The roll unit for use in a surface treatment of a copper foil according to claim 4, wherein thread is formed to an end face of the tapered sleeve, and the bearing is subject to relative displacement on the tapered sleeve by engaging a locknut to the thread and screwing tightly so as to eliminate a gap between the bearing and the tapered sleeve.

6. The roll unit for use in a surface treatment of a copper foil according to claim 5, wherein a washer is inserted between the bearing and the tapered sleeve so as to prevent the loosening of the locknut and facilitate the removal of the bearing.

7. The roll unit for use in a surface treatment of a copper foil according to claim 6, wherein the inner peripheral surface on a tapered sleeve side of the roll-side sleeve is slightly larger than an outer peripheral surface of the tapered sleeve and partially covers the outer peripheral surface of the tapered sleeve, and a gap is provided between the roll-side sleeve and the tapered sleeve so as to enable mutual movement.

8. The roll unit for use in a surface treatment of a copper foil according to claim 7, wherein the roll unit comprises a structure of constraining the relative displacement of the bearing edge by an end face of the roll-side sleeve.

9. The roll unit for use in a surface treatment of a copper foil according to claim 8, wherein, by releasing the constraint of the bearing box cover, the bearing box, the bearing, the roll-side sleeve, the tapered sleeve, the oil seal, the insulating bushing, the adjustment liner, and the washer, all of the foregoing components can be removed from the roll shaft and the mounting frame.

10. The roll unit for use in a surface treatment of a copper foil according to claim 1, wherein a bearing box cover is arranged on an edge of the bearing box via an O-ring.

11. The roll unit for use in a surface treatment of a copper foil according to claim 10, wherein a grease nipple having a structure where grease is introduced is provided to the bearing box immediately above the bearing, and a plug for discharging old grease is disposed on the bearing box cover.

12. The roll unit for use in a surface treatment of a copper foil according to claim 10, wherein, by releasing the constraint of the bearing box cover, the bearing box, the bearing, the roll-side sleeve, the tapered sleeve, and the oil seal, all of the foregoing components can be removed from the roll shaft.

13. The roll unit for use in a surface treatment of a copper foil according to claim 1, wherein thread is formed to an end face of the tapered sleeve, and the bearing is subject to relative displacement on the tapered sleeve by engaging a locknut to the thread and screwing tightly so as to eliminate a gap between the bearing and the tapered sleeve.

14. The roll unit for use in a surface treatment of a copper foil according to claim 13, wherein a washer is inserted between the bearing and the tapered sleeve so as to prevent the loosening of the locknut and facilitate the removal of the bearing.

15. The roll unit for use in a surface treatment of a copper foil according to claim 1, wherein the inner peripheral surface on a tapered sleeve side of the roll-side sleeve is slightly larger than an outer peripheral surface of the tapered sleeve and partially covers the outer peripheral surface of the tapered sleeve, and a gap is provided between the roll-side sleeve and the tapered sleeve so as to enable mutual movement.

16. The roll unit for use in a surface treatment of a copper foil according to claim 1, wherein the roll unit comprises a structure of constraining the relative displacement of an edge of the bearing by an end face of the roll-side sleeve.

17. A roll unit for use in a surface treatment of a copper foil, wherein shaft sleeves are fitted to a roll shaft so that the roll shaft is rotatably supported by a bearing via the shaft sleeves;
   wherein the roll unit comprises a structure where the shaft sleeves consist of two sleeves, namely a roll-side sleeve arranged on a roll main body side and a tapered sleeve arranged on a shaft end side;
   wherein an oil seal is provided between the roll-side sleeve and a bearing box, the tapered sleeve is inserted between the bearing and the roll shaft, and the roll shaft is rotatably supported by the bearing via the tapered sleeve;
   wherein the tapered sleeve to be inserted between the roll shaft and the bearing is of a tapered face in which the diameter of an outer peripheral surface decreases in an edge direction of the roll shaft, and an inner peripheral surface of the bearing opposed to the tapered sleeve has a tapered face in which the inner diameter decreases in an edge direction of the roll shaft; and
   wherein the bearing box is detachably fixed to a roll mounting frame via an insulating bushing.

* * * * *